United States Patent [19]
Uchiyama et al.

[11] Patent Number: 5,942,259
[45] Date of Patent: Aug. 24, 1999

[54] METHOD AND APPARATUS OF CONTROLLING TEMPERATURE OF INJECTION PREFORM FOR STRETCH BLOW MOLDING

[75] Inventors: Mikio Uchiyama, Chiba; Tatsuo Suzuki, Tokyo, both of Japan

[73] Assignee: Tahara Machinery Limited, Tokyo, Japan

[21] Appl. No.: 08/990,838

[22] Filed: Dec. 15, 1997

[30] Foreign Application Priority Data

Dec. 19, 1996 [JP] Japan .................................. 8-339202

[51] Int. Cl.⁶ .................................................. B29C 49/64
[52] U.S. Cl. .................... 425/174.8 R; 425/526; 264/403; 264/457; 264/478; 264/486; 264/535
[58] Field of Search .................................. 264/403, 404, 264/457, 454, 521, 535, 486, 478; 425/174.8 R, 526

[56] References Cited

U.S. PATENT DOCUMENTS

| 3,761,550 | 9/1973 | Seefluth .................................. 264/521 |
| 3,878,282 | 4/1975 | Bonis et al. ............................. 264/535 |
| 3,880,973 | 4/1975 | Yoshikawa et al. ..................... 264/521 |
| 3,934,743 | 1/1976 | McChesney et al. ................... 264/521 |
| 4,315,725 | 2/1982 | Yoshino .................................. 264/403 |
| 4,407,651 | 10/1983 | Beck et al. .............................. 432/11 |
| 4,409,048 | 10/1983 | Hatch et al. ............................ 264/403 |
| 4,590,021 | 5/1986 | Ota et al. ................................ 264/457 |
| 5,180,893 | 1/1993 | Sugiyama et al. ...................... 264/457 |
| 5,611,987 | 3/1997 | Kato et al. .............................. 264/521 |

FOREIGN PATENT DOCUMENTS

| 0 317 644 | 5/1989 | European Pat. Off. . |
| 1411239 | 4/1965 | France .................................. 264/535 |
| 628964 | 11/1961 | Italy ...................................... 264/535 |
| 55-22957 | 2/1980 | Japan . |
| 61-261024 | 11/1986 | Japan .................................... 264/535 |
| 2 024 087 | 1/1980 | United Kingdom . |
| 2 072 091 | 9/1981 | United Kingdom . |

Primary Examiner—Catherine Timm
Attorney, Agent, or Firm—Foley & Lardner

[57] ABSTRACT

A preform heating method for heating a preform for a stretch blow molding is executed by an apparatus which comprises an outer heating die having a cavity for the preform, a thermal-insulating pot surrounding the outer heating die and a high-frequency heating unit installed around to the thermal-insulating pot. The heating of the preformed is executed by locating the heating die around the preform, applying alternating magnetic flux to the heating die to heat the preform through the heating die, and controlling the magnitude of the alternating magnetic flux to control the temperature of the preform.

6 Claims, 4 Drawing Sheets

METHOD AND APPARATUS OF CONTROLLING TEMPERATURE OF INJECTION PREFORM FOR STRETCH BLOW MOLDING

BACKGROUND OF THE INVENTION

1. Field of the Invention

The present invention relates to a method and an apparatus for controlling a temperature of an injection preform for use in a stretch blow molding.

2. Description of Related Art

Conventionally, a far infrared radiation heater has been used for heating an intermediate product of a cylindrical bottle so-called a preform before the execution of the biaxial-orientation stretching blow molding. The preform used in the stretch blow molding is heated by radiation heat of the far infrared radiation heater, and it is necessary to rotate the preform and to heat it for a relatively long time in order to equally heat the surface of the preform.

However, since such a heating method using a far infrared radiation heater is normally arranged to fix a distance to the preform, the temperature dispersion in a longitudinal direction of the preform becomes unstable and therefore the thickness of the product tends to be fluctuated. Further, this conventional heating method requires a heating process equipment which has a relatively long longitudinal dimension. This increases the size of the equipment of such a bottle producing system and the consumption of electric energy for production.

SUMMARY OF THE INVENTION

It is an object of the present invention to provide a method and an apparatus for quickly heating an injection preform for the stretch blow molding and for controlling a temperature of the heated injection preform.

A first aspect of the present invention resides in a method for controlling a temperature of a preform for a stretch blow molding. The method comprises a step for locating a heating die around the preform, a step for applying alternating magnetic flux to the heating die to heat the preform through the heating die and a step for controlling the magnitude of the alternating magnetic flux to control the temperature of the preform.

A second aspect of the present invention resides in an apparatus for controlling a temperature of an injected preform for use in stretch blow molding. The apparatus comprises an outer heating die having a cavity in which the preform is installed, a thermal-insulating pot surrounding the outer heating die and a high-frequency heating unit installed around to the thermal-insulating pot for quickly heating the outer heating die.

DETAILED DESCRIPTION OF THE INVENTION

Referring to FIGS. 1 to 5, there is shown an embodiment of an apparatus for controlling a temperature of an injection preform for use in a stretch blow molding according to the present invention.

Figure 1:
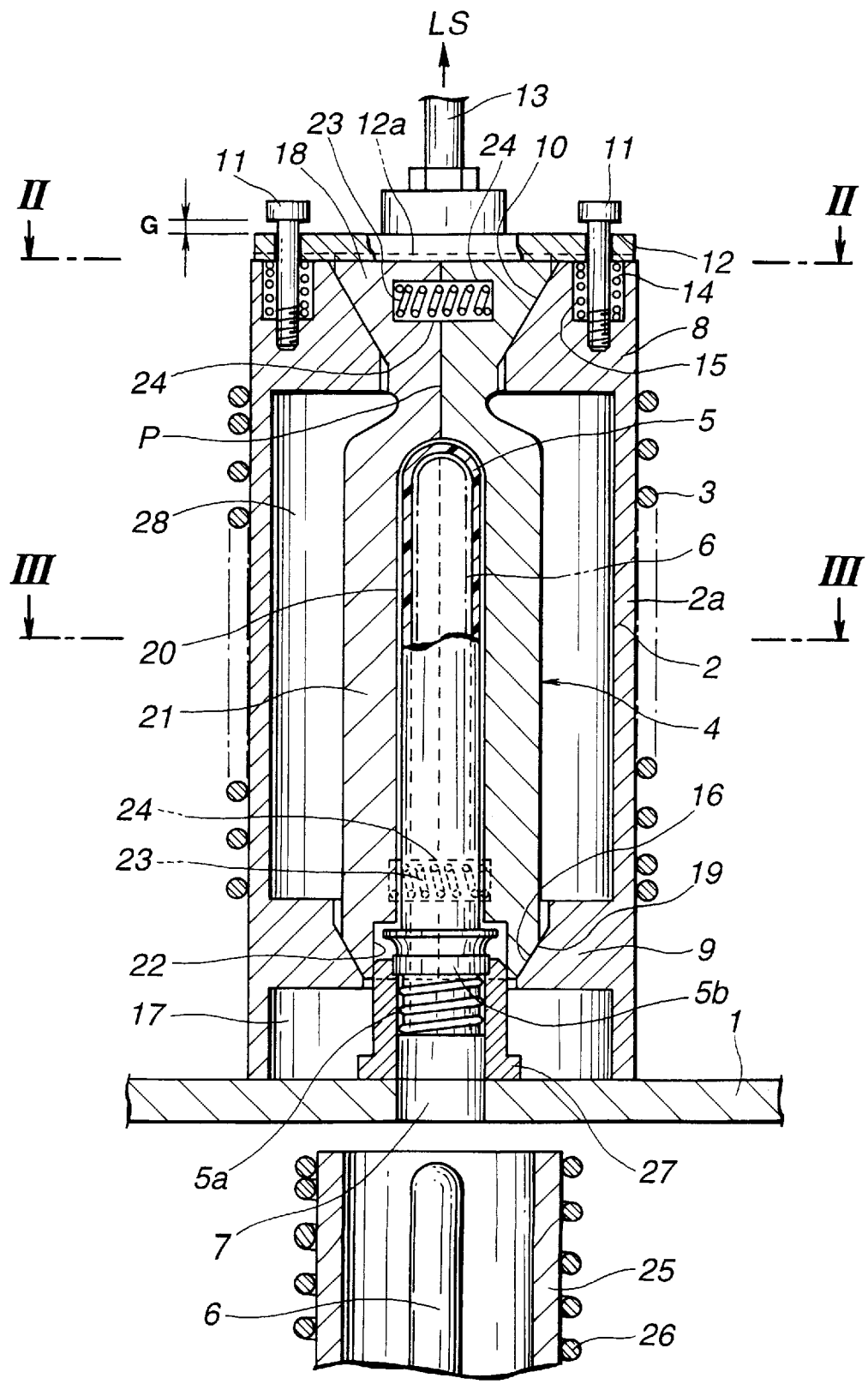
FIG. 1 is a cross sectional view of an embodiment of a preform temperature control apparatus according to the present invention.

As shown in FIG. 1, the apparatus comprises a first thermal-insulating pot 2 which is set on a reference plate 1 such as a base or conveyer. A first heating coil 3 is coiled around an outer periphery of the first thermal-insulating pot 2. A heating die 4 made of metal is installed in the first thermal-insulating pot 2 made of insulating material. The heating die 4 covers around a preform 5 formed into a cylinder having a bottom to heat the preform 5 from an outside thereof, and an inner heating die 6 is inserted into the preform 5 to heat the preform 5 from an inside thereof. The inner heating die 6 is made of metal and is disposed under the reference plate 1 so as to vertically move through a hole 7 of the reference plate 1.

A first space 28 is cylindrically defined between a body portion of the heating die 4 and the first thermal-insulating pot 2. The preform 5 is set in the heating die 4 so as to form a predetermined clearance therebetween. Further, the inner heating die 6 is set in the preform 5 so as to form a second predetermined clearance therebetween.

Figure 2:
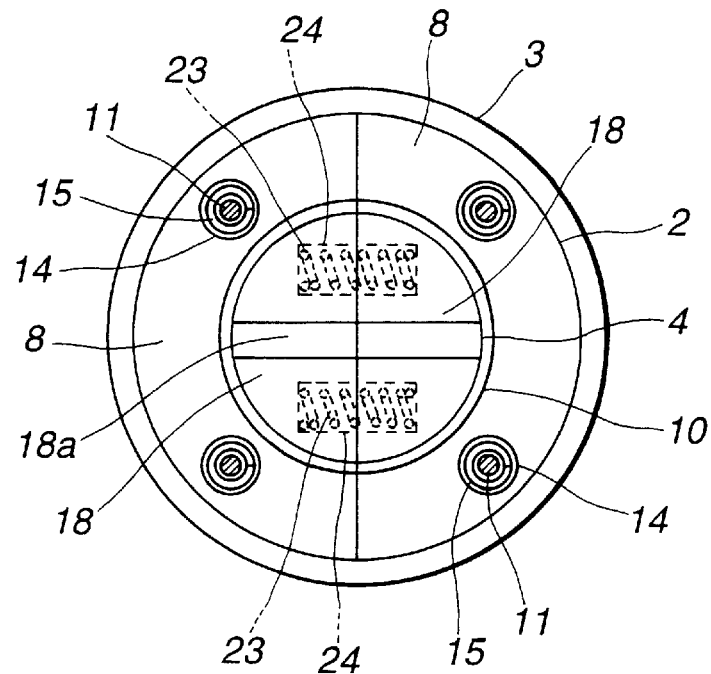
FIG. 2 is a cross sectional view taken in the direction of an arrow II—II of FIG. 1.
Figure 3:
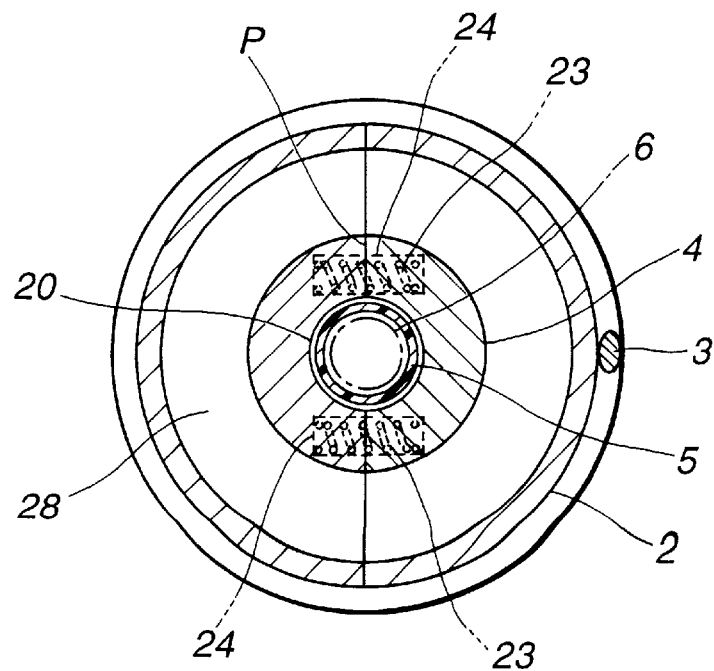
FIG. 3 is a cross sectional view taken in the direction of an arrow III—III of FIG. 1.

The first thermal-insulating pot 2 is constituted by a body portion 2a, an upper bottom portion 8 and a lower bottom portion 9. The upper bottom portion 8 has a first guide hole 10 having a cone-shaped surface as shown in FIG. 1. Four bolts 11 are screwed to the upper bottom portion 8 so as to be located at equal intervals around the center axis of the apparatus as shown in FIG. 2. A predetermined clearance G is formed between a head portion of the bolt 11 and a connecting plate 12 or between the connecting plate 12 and the first thermal-insulating pot 2. The connecting plate 12 is connected with a lifter rod 13 for moving up and down the first thermal-insulating pot 2. The lifter rod 13 is connected to a lifter power source LS such as a hydraulic cylinder or electric motor. Four holes 14 are formed on the upper bottom portion 8 such that each of the holes 14 is formed on each of four internal thread portions of the upper bottom portion 8 to which each bolt 11 is screwed. A coil spring 15 is installed in each hole 14 so as to surround the bolt 11. The coil spring 15 pushes the connecting plate 12 upwardly. Each of the bolts 11 is screwed to the first thermal-insulating pot 2 so that its head portion projects from an upper surface of the upper bottom portion 8. On the other hand, the lower bottom portion 9 has a second guide hole 16 formed into a cone-shape. A space 17 for receiving a bottle inlet portion 5a of the preform 5 is formed between the lower bottom portion 9 and the reference plate 1.

The heating die 4 is constituted by a body portion 21 having a cavity 20 for receiving the preform 5, a cone-shaped head portion 18 connected to an upper end of the body portion 21, and a tapered portion 19 connected to a lower end of the body portion 21. The head portion 18 is engaged with the first guide hole 10 formed at the lower bottom portion 9 of the first thermal-insulating pot 2. The tapered portion 19 having a cone-shaped outer surface is engaged with the second guide hole 16. A chamber 22, through which a bottle neck portion 5b of the preform 5 is engaged, is formed at a bottom portion of the body portion 21 so as to communicate with the cavity 20. The heating die 4 is vertically divided into two parts on a parting surface P including a center axis as shown in FIG. 1.

A projecting portion 18a is formed at the head portion 18 of the heating die 4 so as to be perpendicular to the parting surface P as shown in FIG. 2. The projecting portion 18a is engaged with a groove 12a formed on the connecting plate 12 so as to guide the separating operation of the heating die 4. Coil springs 23 are disposed in holes 24 formed in the vicinities of the heat portion 18 and the chamber 22. The coil springs 23 are set in the biased condition to apply the force to the heating die 4 so as to separate the heating die 4 into two parts at the parting surface P, as shown in FIG. 1.

In order to heat the inner surface of the preform 5, the inner heating die 6 is moved down and set in a second thermal-insulating pot 25 disposed under the reference plate 1. The inner heating die 6 in the second thermal-insulating pot 25 is controllably heated by a second heating coil 26 coiled around the second thermal-insulating pot 25 made of insulating material. The second heating coil 26 is connected to a not-shown electric power source for applying high-frequency current so that the second heating coil 26 executes high-frequency heating of the inner heating die 6.

The preform 5 is formed into a bottle shape so as to have an inlet portion 5a and the bottle neck portion 5b and is supported by a preform setting jig 27 set on the hole 7 of the reference plate 1. It will be understood that the reference plate 1 may be replaced by a conveyer including the preform setting jig 27 for a line production system.

The first and second heating coils 3 and 26 are set so as to surround the first and second thermal-insulating pots 2 and 25, respectively and are connected with a high-frequency wave electric source. Therefore, by applying electric current to the first and second heating coils 2 and 26, the strong magnetic fields are generated around them. Alternating magnetic flux passes through the heating die 4 and inner heating die 6, and therefore extremely high-density current (eddy current) is induced. Accordingly, the heating die 4 and the inner heating die 6 are rapidly heated. By heating the preform 5 by means of the radiation heat of the heating die 4 an the inner heating die 6, the preform 5 increases its volume to fit with the heating die 4. This further promotes the heating operation.

Next, the manner of operation of the embodiment of the preform heating apparatus according to the present invention will be discussed.

Figure 5:
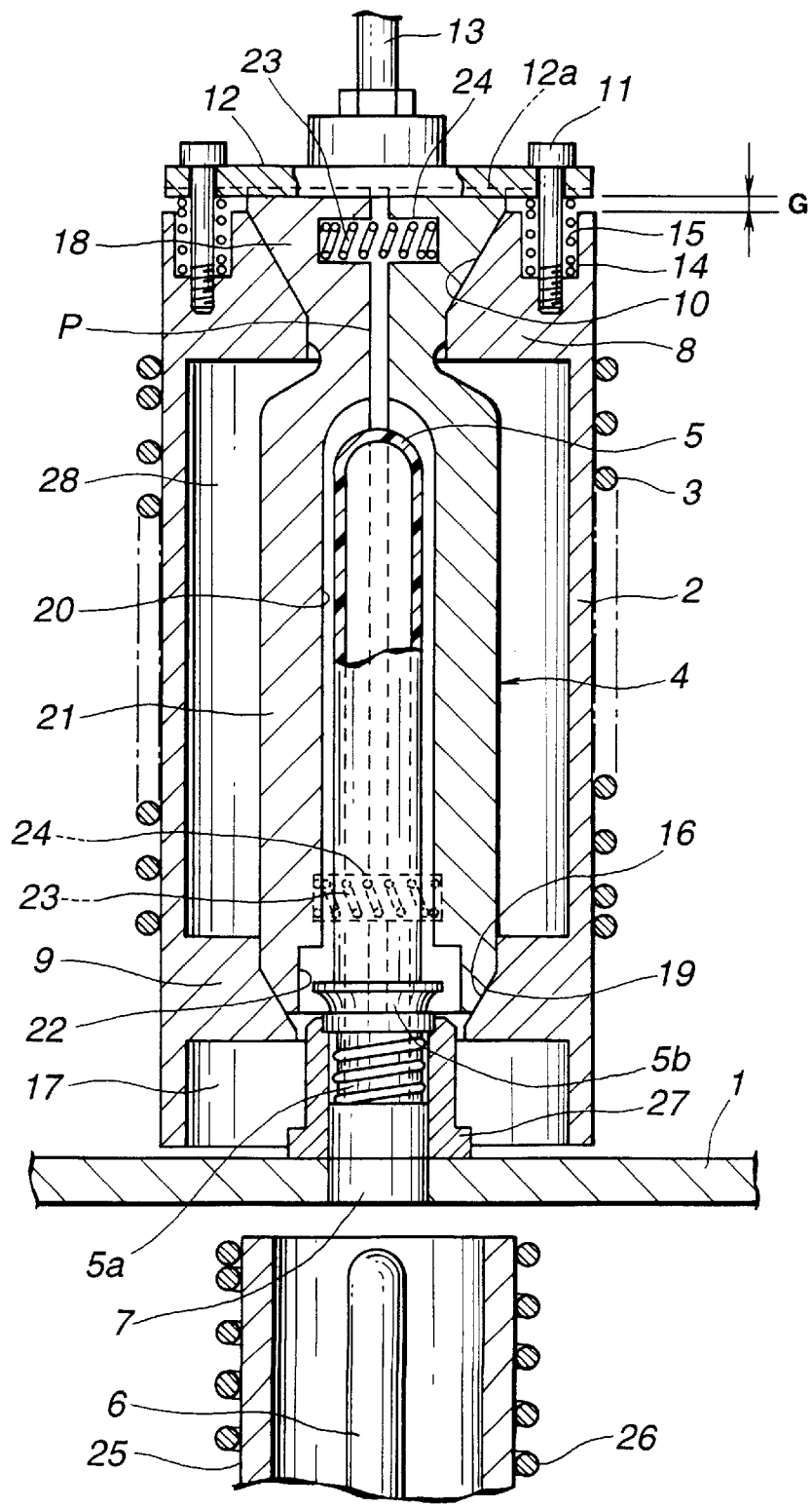
FIG. 5 is a cross sectional view for explaining the operation of the apparatus of FIG. 1.

By operating the lifter power source LS in the condition shown in FIG. 1, the lifter rod 13 and the connecting plate 12 are integrally moved up, and therefore the bolts 11 are lifted. By the pushing force of the springs 15, the clearance G is generated between the connecting plate 12 and the upper surface of the first thermal-insulating pot 2 as shown in FIG. 5. Accordingly, the heading die 4 engaged with the first thermal-insulating pot 2 is separated into two parts by means of the pushing force of the springs 23, 23 at the parting surface P.

Therefore, the heating die 4 is opened at the parting surface P upon sliding on the surfaces of the first guide hole 10 and the second guide hole 16. Then, by further lifting up the lifter rod 13, the first thermal-insulating pot 2 and the heating die 4 is removed from the preform 5. Simultaneously, the inner heating die 6 is moved down through the hole 7 of the reference plate 1 to leave from the preform 5. By these operations, the temperature controlled preform 5 is remained on the reference plate 1. The preform 5 is sent to a step of the biaxial-orientation stretching blow molding.

Next, in order to heat a new preform 5, the new preform 5 is set on the preform setting jig 27 of the reference plate 1. Then, the inner heating die 6 heated in the second thermal-insulating pot 25 is raised up through the hole 7 and inserted into the preform 5. Further, the lifter rod 13 is moved down by the operation of the lifter power source LS. By this operation, the first thermal-insulating pot 2 holding the heating die 4 in the opened state is moved down, and therefore the preform 5 is received in the cavity 20 of the heating die 4, as shown in FIG. 5. Further, the lifter rod 13 is moved down such that the first thermal-insulating pot 2 is put on the reference plate 1 and that the heating die 4 is pushed downward by the connecting plate 12 when the clearance G is generated between the head portion of the bolts 11 and the connecting plate 12, as shown in FIG. 1. Therefore, the head portion 18 and the tapered portion 19 slide on the first and second guide holes 10 and 16 while pushing the springs 23. Finally, the separated heating die 4 is fittingly contacted at the parting surface P. Therefore, it becomes possible to equivalently or freely heat the preform 5 within a short time.

Figure 4A:
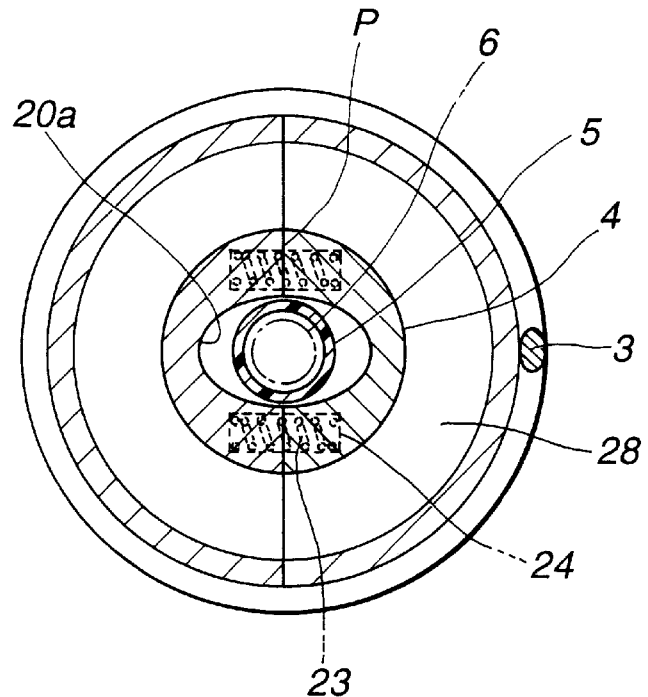
FIG. 4A is a cross sectional view which shows a modification of a heating die of FIG. 1.
Figure 4B:
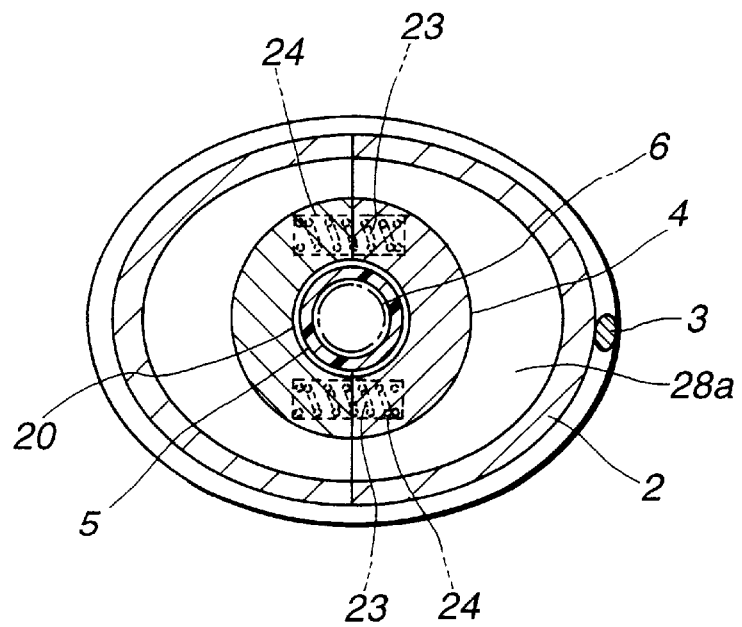
FIG. 4B is a cross sectional view which shows a modification of a first thermal-insulating pot of FIG. 1.

FIG. 4A shows a modification of the cavity 20a. The cavity 20a shown in FIG. 4A is arranged such that its cross section is deformed into ellipse. By this modification, the temperature difference is generated on the surface of the preform 5 according the distance between the outer surface of the preform 5 and the inner elliptic surface of the heating die 4. This modification preferably functions to form a flatted bottle by biaxial-orientation stretching blow molding so as not to generate the deviation of the thickness of the material. FIG. 4B shows another modification of the preform heating apparatus. In this modification, the first thermal-insulating pot 2 is arranged such that its cross section is formed into ellipse. This modification generates the temperature difference on the surface of the preform 5 according to the distance between the elliptic inner surface of the first thermal-insulating pot 2 and the circular outer surface of the heating die 4.

With the arrangement according to the present invention, since the preform heating apparatus according to the present invention employs the high-frequency electromagnetic induction heating method, the heating operation is executed within a short time as compared with the conventional far-infrared radiation heating method. This further improves the energy consumption. Additionally, since the apparatus according to the present invention does not requires a preform rotating mechanism, a required space for the equipment is further decreased. The structure that heating coil 3, 26 is coiled around the thermal-insulating pot 2, 25 enables the preform to be equivalently heated in the circumferential direction. Further, by modifying the coiled condition of the heating coil 3, the horizontal and vertical dimensions of the space portion between the heating die 4 and the preform 5, and the space portion between the thermal-insulating pot 2 and the heating die 4, it becomes possible to heat the preform 5 so as to positively generate a temperature difference at its surface.

The entire disclosure of Japanese Patent Application No. 8-339202 filed on Dec. 19, 1996 including specification, claims, drawings and summary is incorporated herein by reference in its entirety.

What is claimed is:

1. An apparatus for controlling a temperature of an injected preform for use in stretch blow molding comprising:

an outer heating die having a cavity in which the preform is installed;

a thermal-insulating pot surrounding said outer heating die;

a high-frequency heating coil coiled around said thermal-insulating pot for heating said outer heating die;

a reference plate on which said outer heating die is disposed, said reference plate having a center hole;

an inner heating die which is inserted into the preform through the center hole of said reference plate;

an inner thermal-insulating pot disposed under said reference plate; and an inner high-frequency wave heating unit installed around said inner thermal-insulating pot for heating said inner heating die.

2. An apparatus for controlling a temperature of an injected preform for use in stretch blow molding comprising:

an outer heating die having a cavity in which the preform is installed;

a thermal-insulating pot surrounding said outer heating die;

a high-frequency heating coil coiled around said thermal-insulating pot for heating said outer heating die;

a reference plate on which said outer heating die is disposed, said reference plate having a center hole; and a lifter unit connected to said thermal-insulating pot and lifts up said thermal-insulating pot from said reference plate.

3. An apparatus for controlling a temperature of an injected preform for use in stretch blow molding comprising:

an outer heating die having a cavity in which the preform is installed;

a thermal-insulating pot surrounding said outer heating die;

a high-frequency heating coil coiled around said thermal-insulating pot for heating said outer heating die; and wherein said thermal-insulating pot is in the shape of a cylinder having an upper bottom portion for supporting an upper portion of said outer heating die and a lower bottom portion for supporting a lower portion of said outer heating die.

4. An apparatus as claimed in claim 3, wherein said heating die is constituted by a body portion in which the cavity is formed, a head portion supported the upper bottom portion of said thermal-insulating pot and a tapered portion supported by the lower bottom portion of said thermal-insulating pot.

5. An apparatus as claimed in claim 3, wherein said heating die is divided into two blocks at a parting surface which is formed on a center axis of said heating die.

6. An apparatus for controlling a temperature of an injected preform for use in stretch blow molding comprising:

an outer heating die having a cavity in which the preform is installed;

a thermal-insulating pot surrounding said outer heating die, said thermal-insulating pot being in the shape of a cylinder having an upper bottom portion for supporting an upper portion of said outer heating die and a lower bottom portion for supporting a lower portion of said outer heating die; and a high-frequency heating unit installed proximate said thermal-insulating pot for heating said outer heating die, and a space portion is located between the body portion of said heating die and said outer thermal-insulating pot.

* * * * *